Patented Mar. 27, 1934

1,952,255

UNITED STATES PATENT OFFICE 1,952,255

SYNTHETIC PRECIOUS STONE

Max Jaeger and Hermann Espig, Bitterfeld, Germany, assignors to I. G. Farbenindustrie Aktiengesellschaft, Frankfort - on - the - Main, Germany No Drawing. Application April 25, 1931, Serial No. 532,983. In Germany April 30, 1930

4 Claims. (Cl. 106—36.1)

The present invention relates to the production of synthetic precious stones and is particularly concerned with a synthetic spinel having, with respect to its color, the characteristics of an alexandrite.

According to a known process, a synthetic green spinel is obtained by incorporating in the raw material mixture usually employed for making synthetic spinels, which consists of about 85 parts by weight of $Al_2O_3$ and 15 parts by weight of MgO in finely powdered and intimately mixed form, a small quantity of chromium, preferably as chromium oxide, together with traces of iron and vanadium. The stones thus produced display the characteristic property of the alexandrites, inasmuch as the color changes from green to purple when the stone is viewed in artificial light. However, the green daylight color of such stones is not clear owing to a decided touch of olive.

The main object of the present invention, therefore, is a modification of the known process in order to produce a synthetic spinel displaying with respect to its color all characteristics of the alexandrite, while avoiding the undesirable feature aforementioned. This is effected by adding a trace of cobalt to the mixture of raw materials as described. The addition of iron and/or vanadium, however, in the present case is not indispensable, these additions, when present, rather effecting merely a shading of the color of the stone.

Example

In 100 parts of a basic mixture of raw materials yielding a synthetic spinel and consisting of 85 percent of $Al_2O_3$ and 15 percent of MgO, 1 part by weight of chromium oxide and 0.06 parts by weight of metallic cobalt are incorporated in finely dispersed form and the resulting powder is fused according to the well known Verneuil process. If desired 0.04 parts by weight of iron and 0.04 parts by weight of vanadium in the form of the respective metals may be added for shading.

We claim:

1. A composition of matter adapted to produce when fused a synthetic spinel having a clear green daylight color and with respect to its appearance in artificial light, the characteristics of an alexandrite, consisting of a basic mixture of about 85 parts by weight of alumina and about 15 parts by weight of magnesia, and incorporated in said basic mixture approximately one part by weight of chromium oxide and approximately 0.06 parts by weight of metallic cobalt.

2. A composition of matter adapted to produce when fused a synthetic spinel having a clear green daylight color and with respect to its appearance in artificial light, the characteristics of an alexandrite, consisting of a basic mixture of about 85 parts by weight of alumina and about 15 parts by weight of magnesia, and incorporated in said basic mixture approximately one part by weight of chromium oxide, approximately 0.06 parts by weight of metallic cobalt, and further about 0.04 parts by weight of iron and about 0.04 parts by weight of vanadium.

3. A synthetic spinel having with respect to its color the characteristics of an alexandrite consisting of about 85 parts by weight of alumina, about 15 parts by weight of magnesia, about 1 part by weight of chromium oxide and about 0.06 parts by weight of cobalt.

4. A synthetic spinel having with respect to its color the characteristics of an alexandrite consisting of about 85 parts by weight of alumina, about 15 parts by weight of magnesia, about one part by weight of chromium oxide, about 0.06 parts by weight of cobalt, about 0.04 parts by weight of iron, and about 0.04 parts by weight of vanadium.

MAX JAEGER.
HERMANN ESPIG.